April 27, 1937.    J. M. LE GRAND    2,078,606
THERMAL INSULATION FOR VALVED PIPE INSTALLATION
Filed April 2, 1934        9 Sheets-Sheet 1
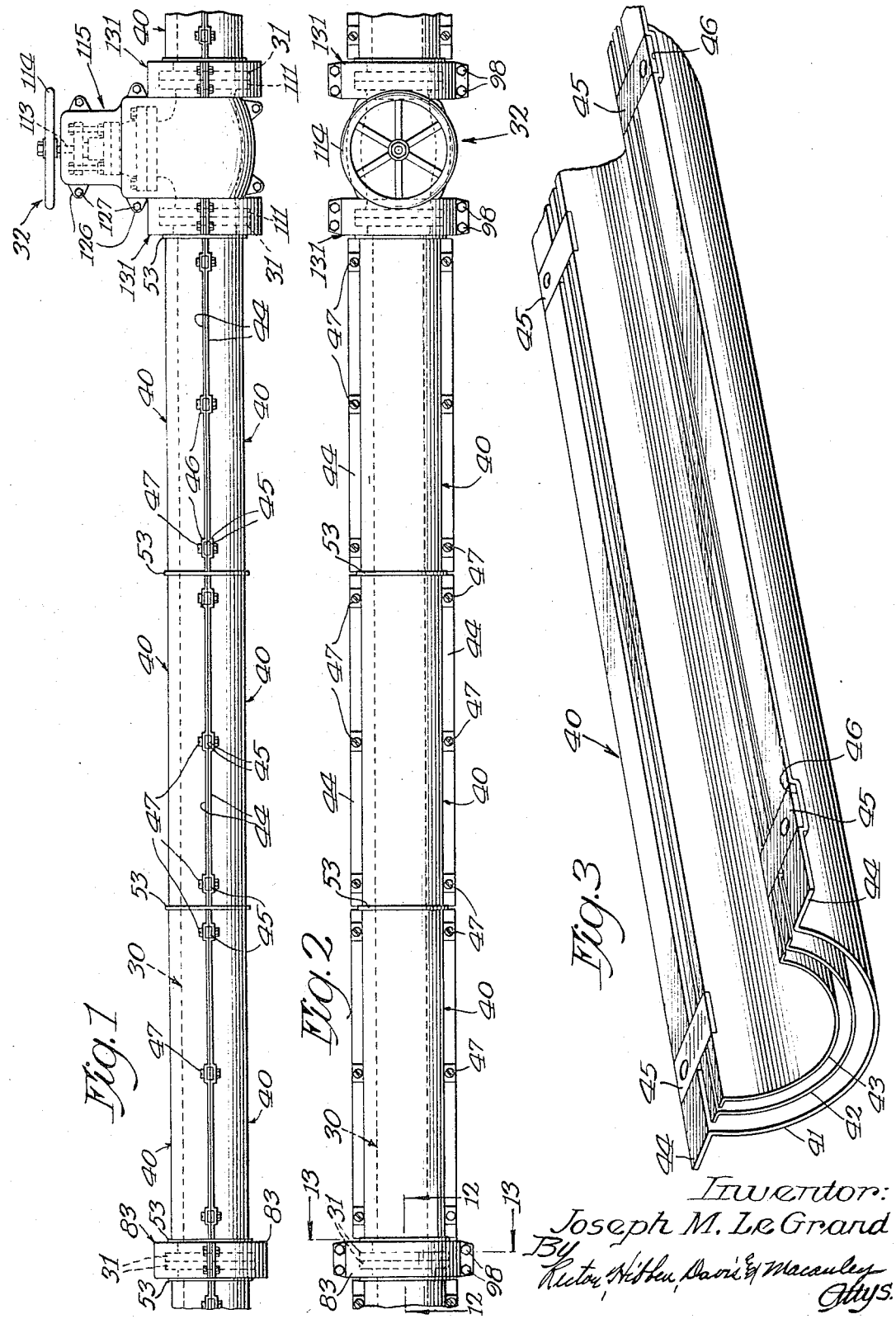

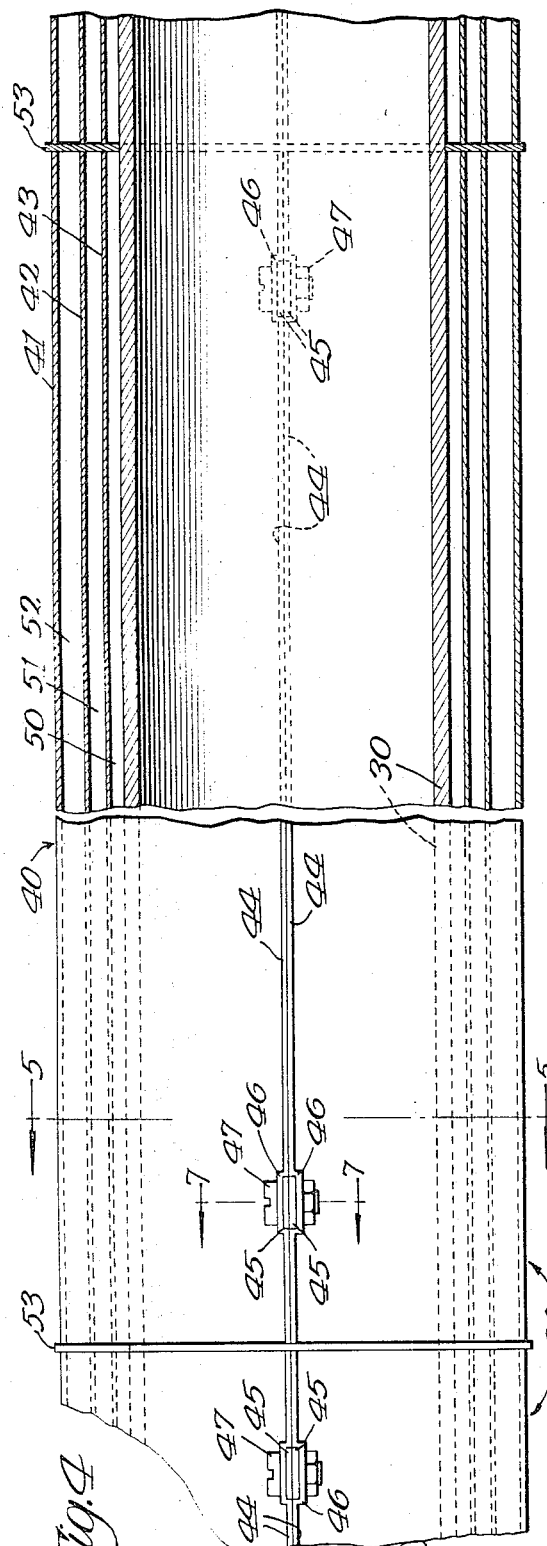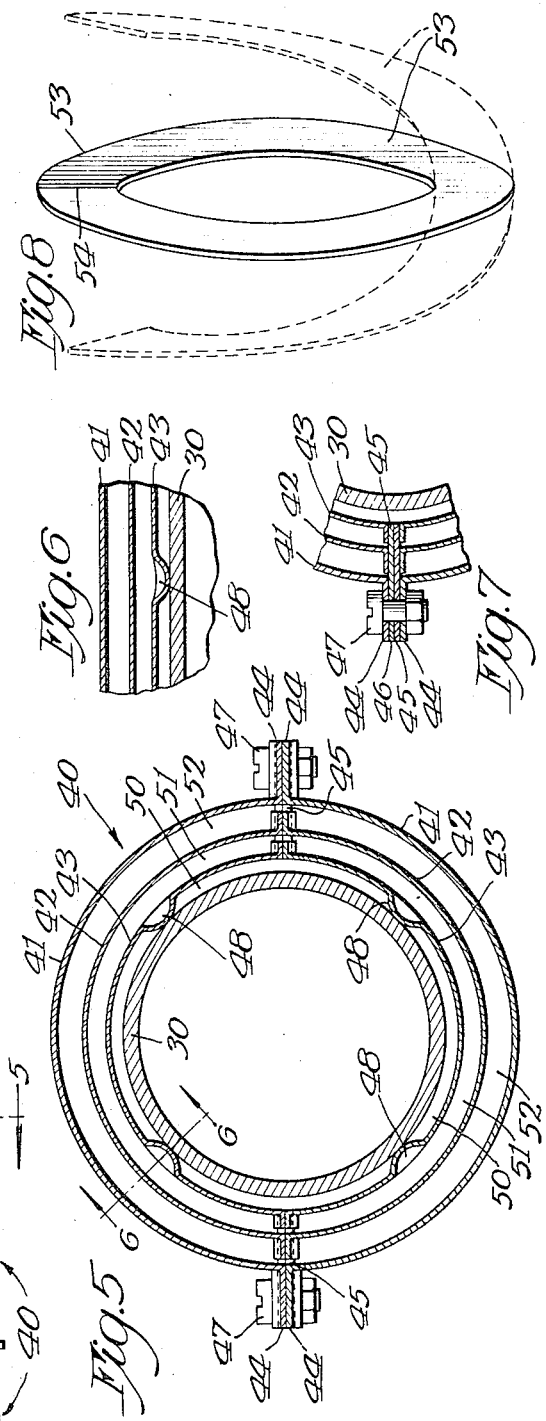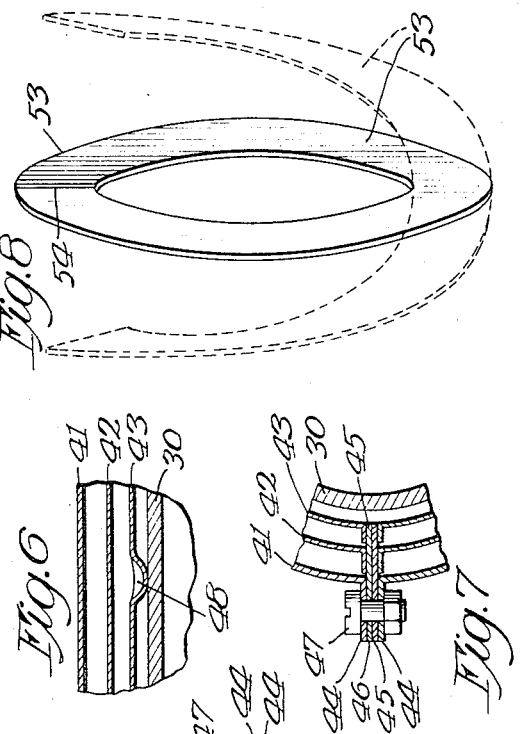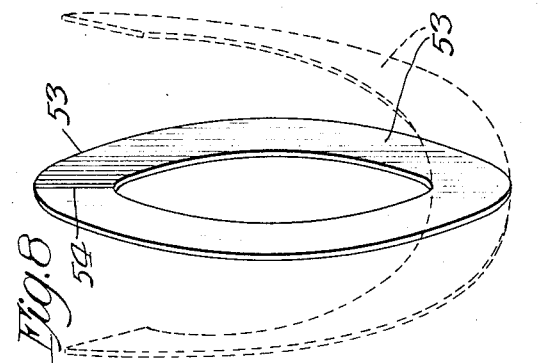

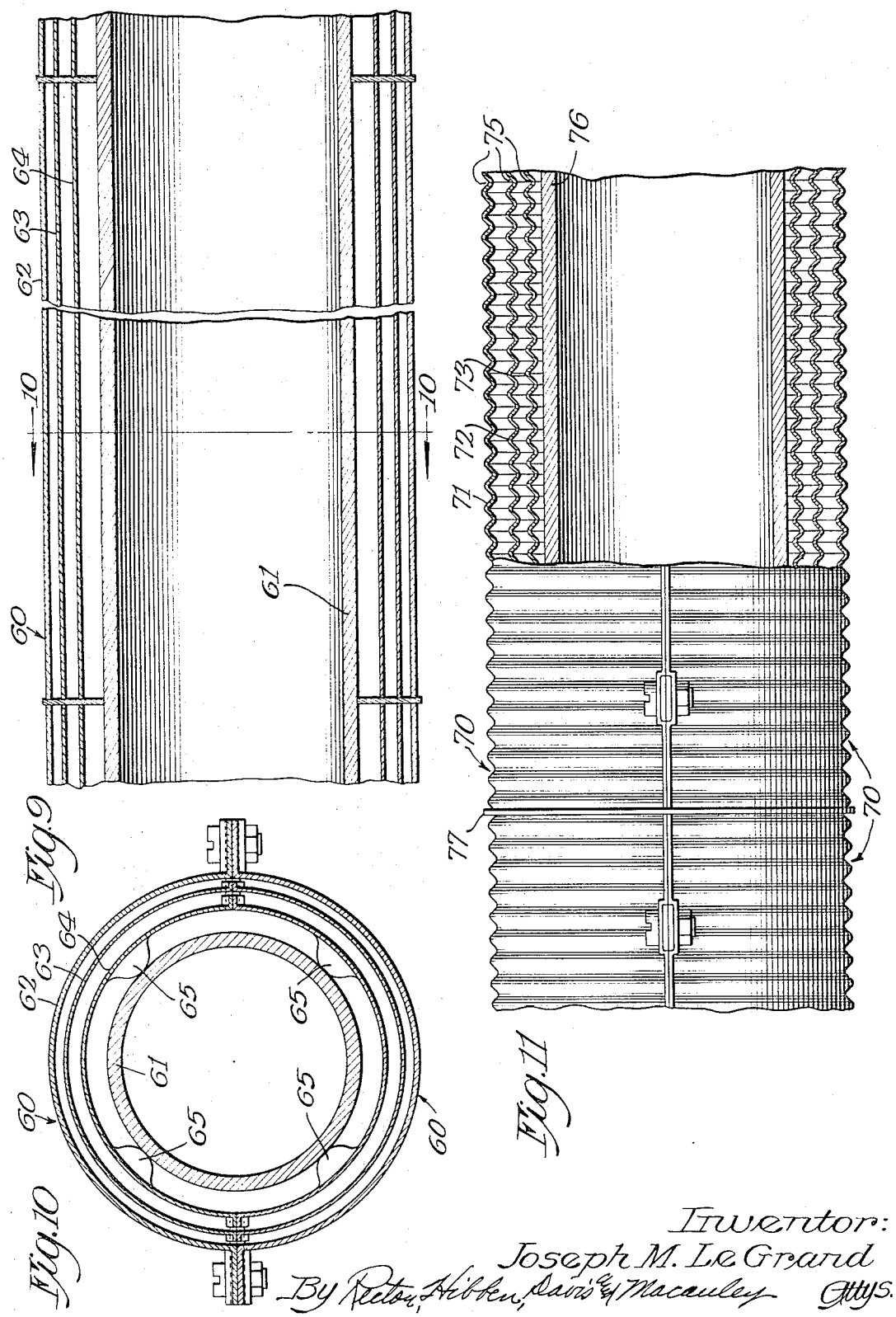

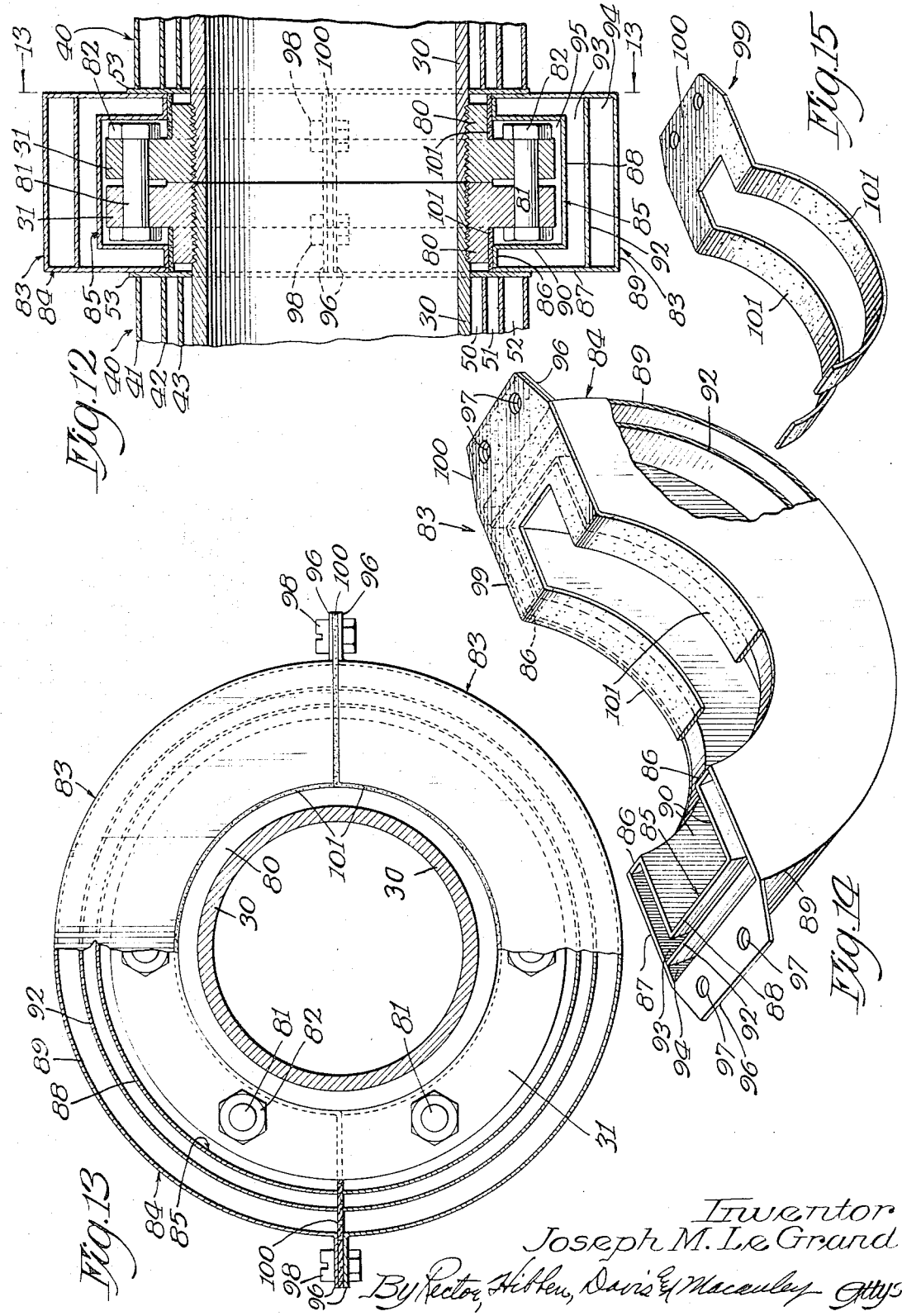

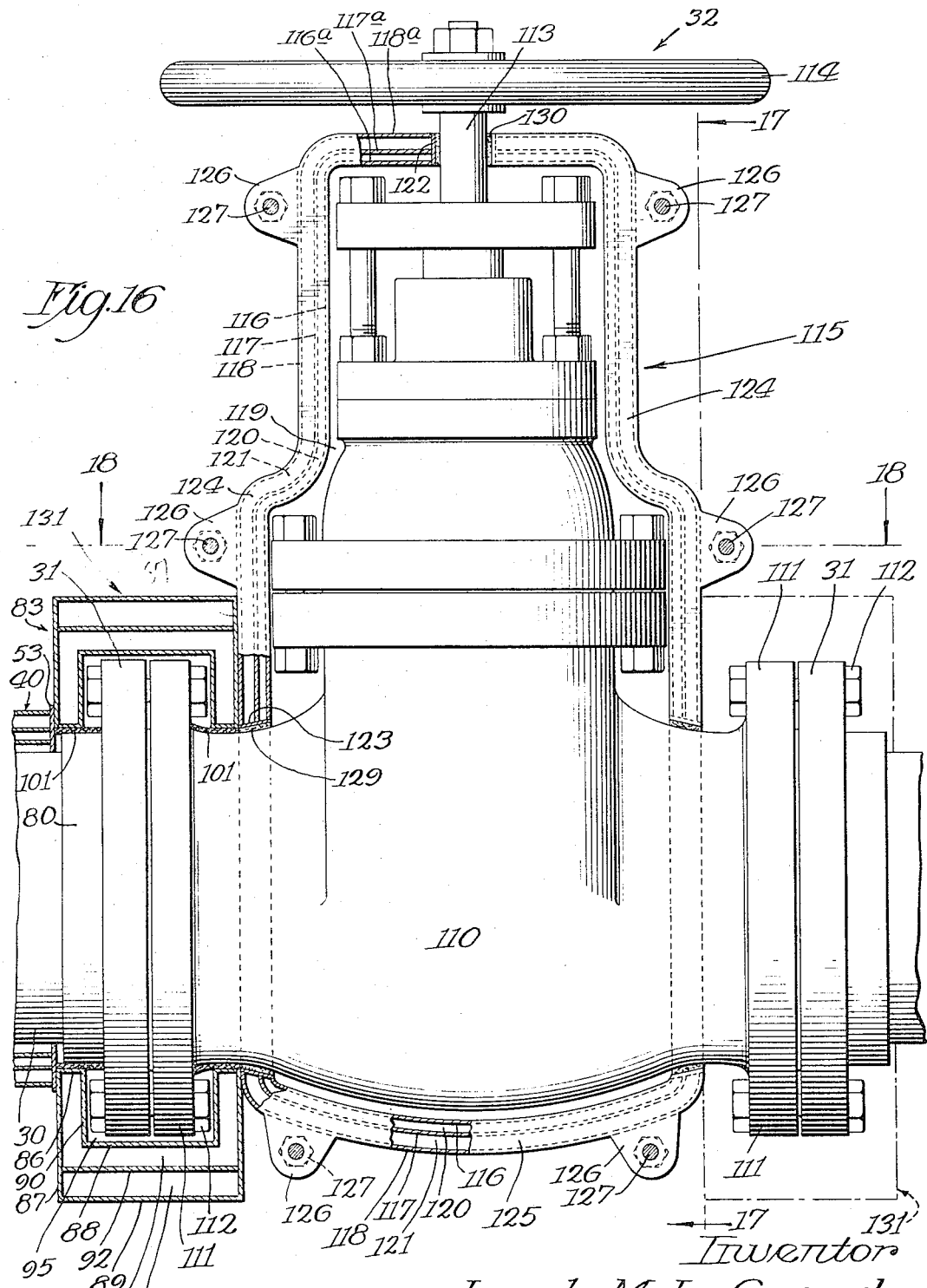

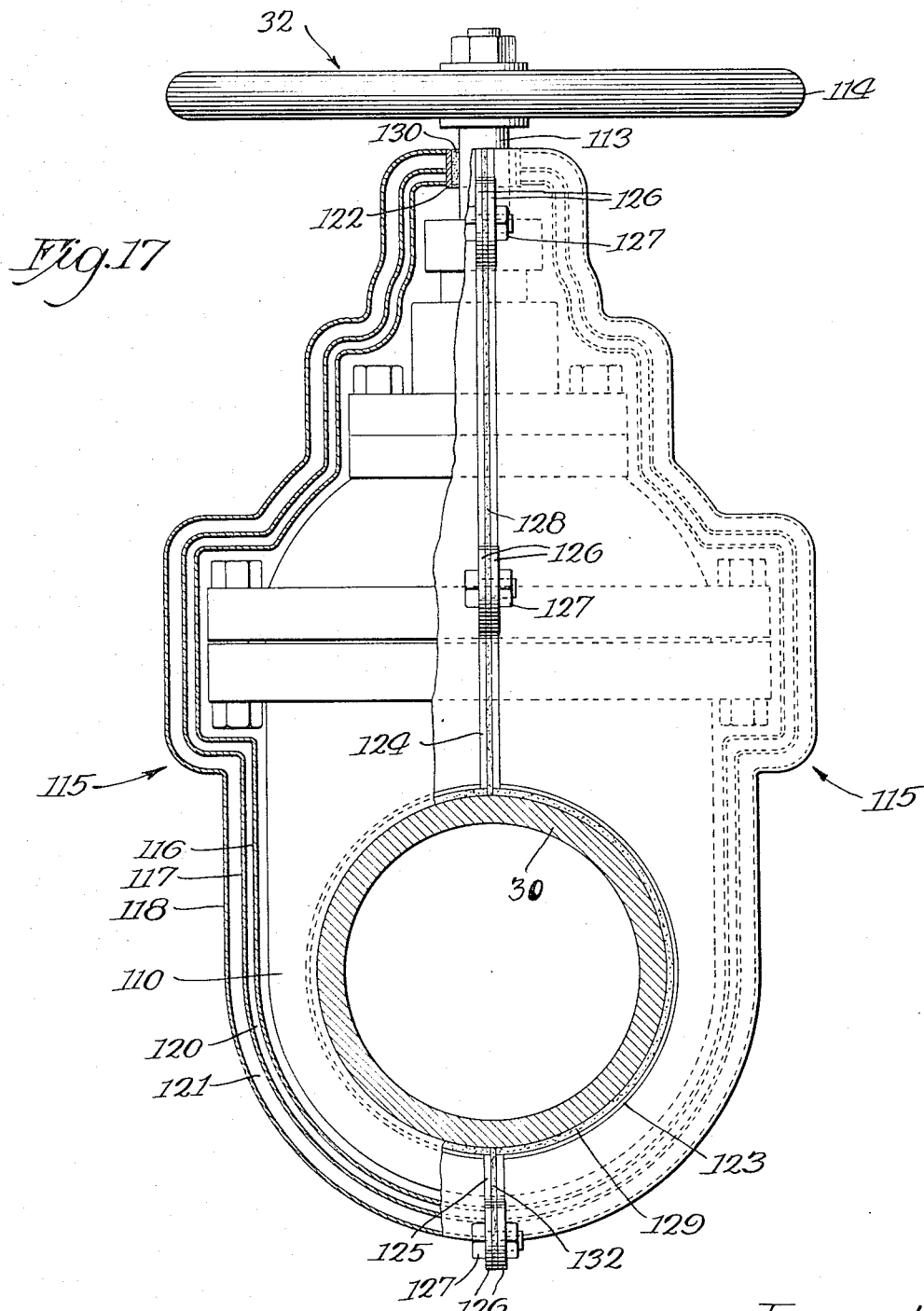

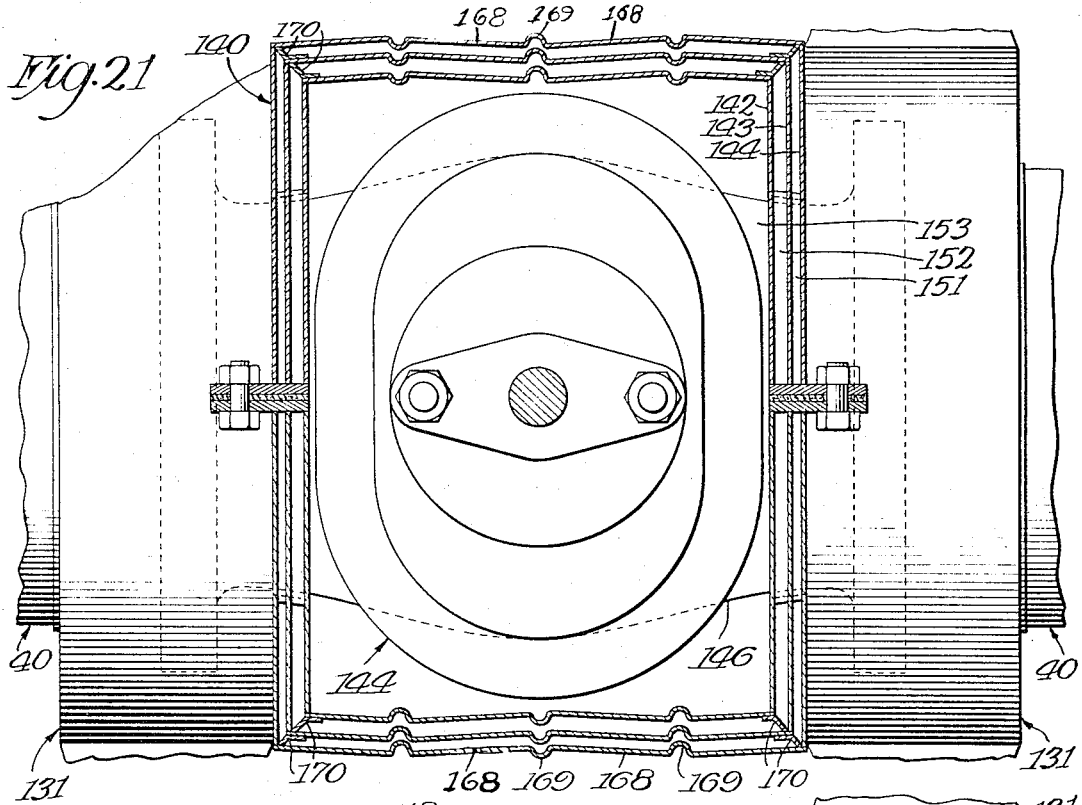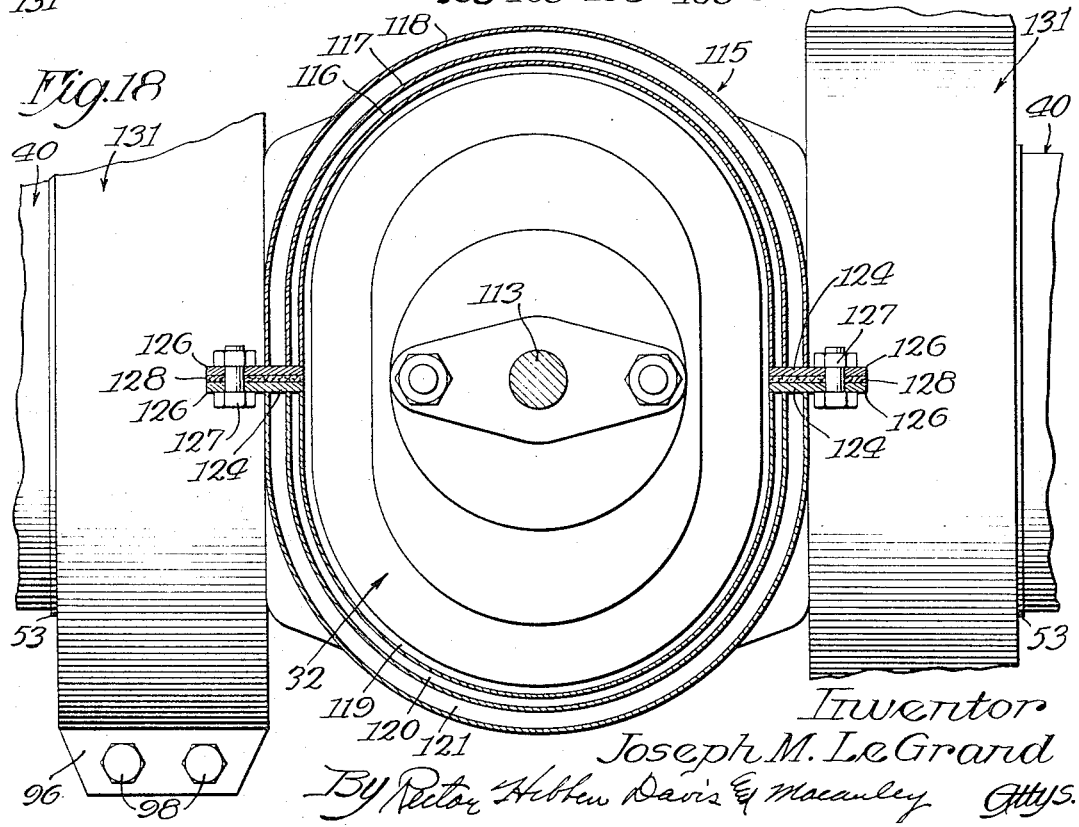

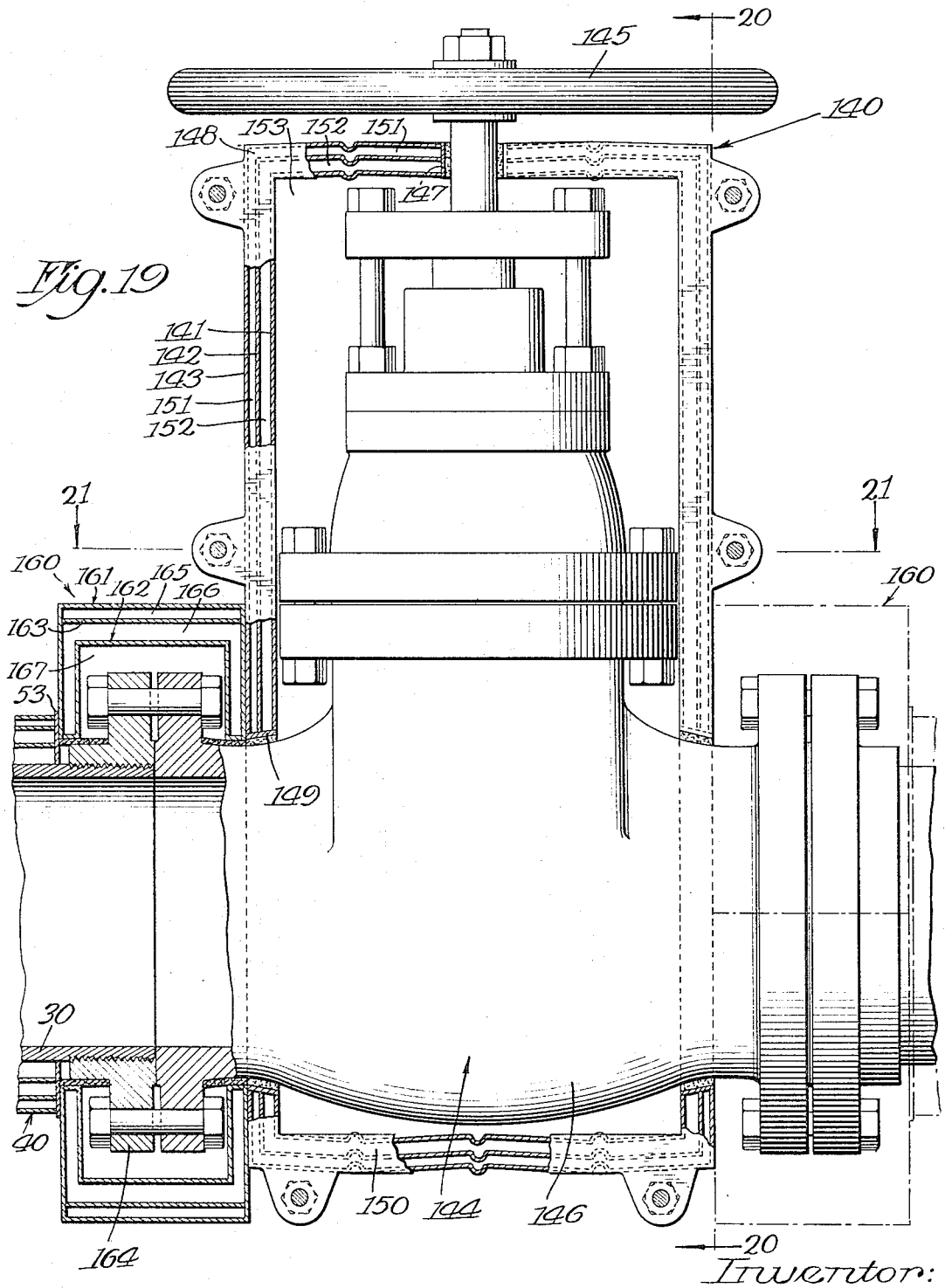

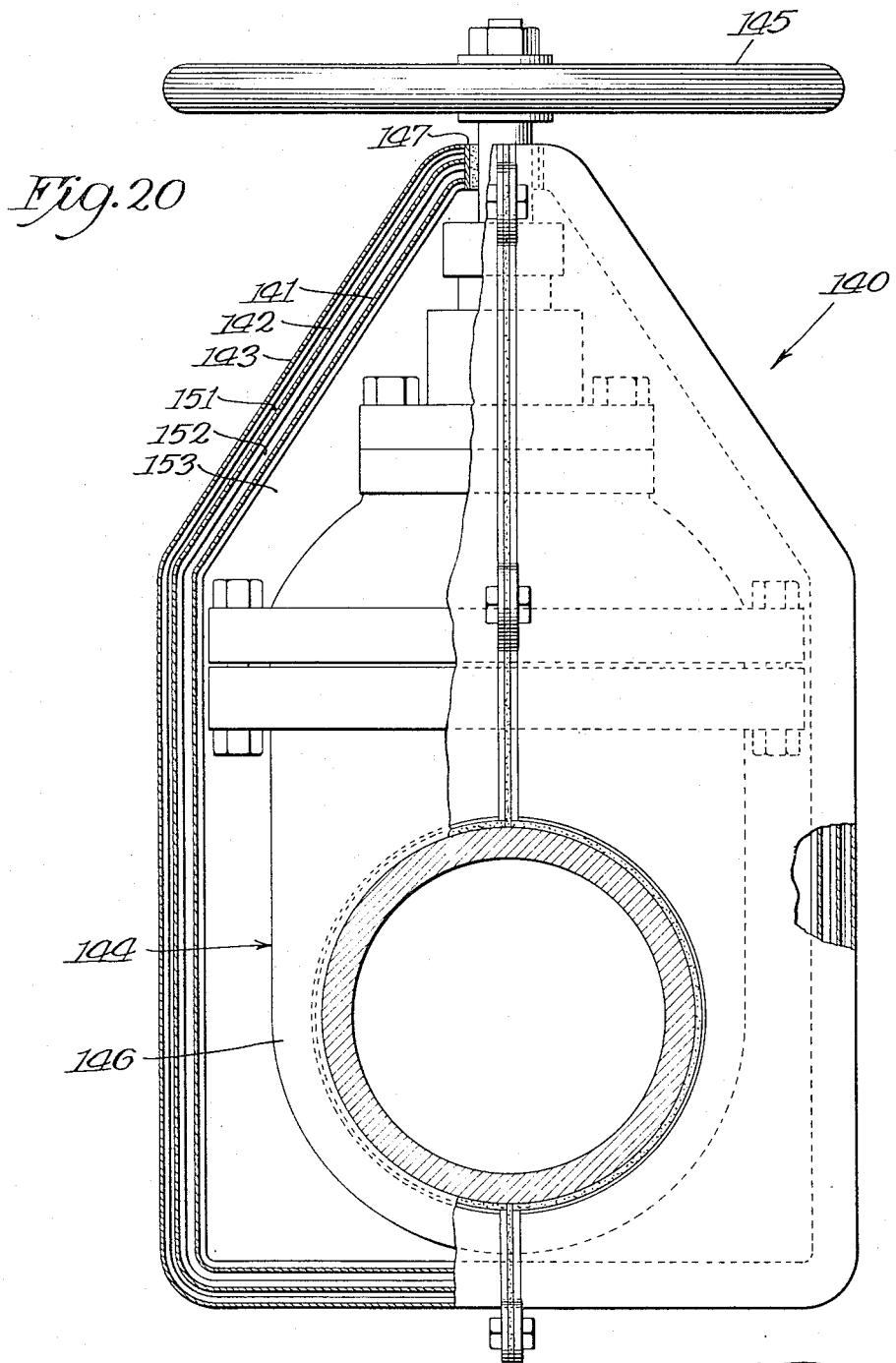

Patented Apr. 27, 1937

2,078,606

UNITED STATES PATENT OFFICE 2,078,606

THERMAL INSULATION FOR VALVED PIPE INSTALLATION

Joseph M. Le Grand, Heathsville, Va.

Application April 2, 1934, Serial No. 718,670

30 Claims. (Cl. 154—45)

This invention relates to thermal insulation and it has to do particularly with structure for thermally insulating valved pipe installations.

One of the objects of the invention is to provide improved means for thermally insulating installations of the foregoing character.

Another object is to provide means for thermally insulating pipes or sections thereof.

A further object is to provide improved means for thermally insulating pipe flanges and fittings which serve to interconnect adjacent pipe sections.

Still another object is to provide improved means for thermally insulating valves which control the flow of fluid, etc., through the pipe structure.

An additional object is to provide thermal insulation means for the foregoing purposes which includes a plurality of metallic sheets of sufficient stiffness and thickness to retain preformed shape and which are formed of a material which possesses relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, said sheets being spaced with respect to each other and to the structure insulated in the manner disclosed in Letters Patent No. 1,910,703, granted to me on May 23, 1933.

A more specific object is to provide thermal insulation means of the foregoing character which includes a plurality of self-contained metallic units detachably mounted upon the valved pipe assembly, which units are of such character that they may be cheaply manufactured, they may be stocked ready for use in quantity by dealers, they may be easily and quickly applied to and removed from the structure to be insulated, and they may be used over and over again as the circumstances may require.

It is a further object of the invention to provide a thermal insulation for valved pipe structure which is of simple form; which is of light weight; which insures increased insulation efficiency at lower cost to the user; which is durable and will insulate with near maximum efficiency throughout the life of the structure insulated; which is free from condensation effects under ordinary operating conditions; which insures a substantially uniform insulation effect throughout the entire surface of the structure insulated; which is substantially fireproof; which is proof against vermin, insects, bacteria, rodents and various gases; and which requires practically no maintenance attention when in sue.

Other objects and advantages will become apparent as this description progresses and by reference to the drawings wherein:—

Figure 1 is a side elevational view of one form of valved pipe structure embodying my invention, this structure being particularly adapted for the conveyance of a hot fluid, gas, vapor, etc.

Fig. 2 is a top plan view of the structure shown in Fig. 1;

Fig. 3 is an enlarged, separated, perspective view of a portion of one of the pipe insulation units shown assembled in Figs. 1 and 2;

Fig. 4 is an enlarged, elevational view, partially in longitudinal section, of a portion of the pipe insulation structure shown in Fig. 1;

Fig. 5 is a cross-sectional view taken substantially on line 5—5 of Fig. 4;

Fig. 6 is a section taken substantially on line 6—6 of Fig. 5;

Fig. 7 is a section taken substantially on line 7—7 of Fig. 4;

Fig. 8 is an enlarged, separated perspective view of a washer-like member employed for blanking the ends of one pipe insulation unit from the ends of the adjacent units, which member is shown in dotted lines in a distended pipe-application position;

Fig. 9 is a longitudinal sectional view of a pipe structure embodying my invention and adapted for the conveyance of a cold fluid, gas, etc.;

Fig. 10 is a sectional view taken substantially on line 10—10 of Fig. 9;

Fig. 11 is a side elevational view, partially in section, of another form of pipe insulation embodying my invention;

Fig. 12 is an enlarged longitudinal sectional view of the pipe flange insulation structure shown in Figs. 1 and 2, the same being taken substantially on line 12—12 of Fig. 2;

Fig. 13 is another enlarged sectional view of the pipe flange insulation structure taken substantially on lines 13—13 of Figs. 2 and 12;

Fig. 14 is a separated perspective view of one of the pipe flange insulation units shown in Figs. 12 and 13;

Fig. 15 is a separated perspective view of the gasket mounted between the unit of Fig. 14 and the pipe flange shown in Fig. 12;

Fig. 16 is an enlarged central longitudinal sectional view of the valve insulation structure shown in Figs. 1 and 2;

Fig. 17 is a section taken substantially on line

17—17 of Fig. 16, the valve insulation structure being shown partly in cross-section and partly in elevation;

Fig. 18 is a section taken substantially on line 18—18 of Fig. 16;

Fig. 19 is a sectional view, similar to Fig. 16, of another form of valve insulation structure embodying my invention, and adapted for so-called "cold" pipe insulation;

Fig. 20 is a sectional view taken substantially on line 20—20 of Fig. 19, the valve insulation structure being shown partly in cross section and partly in elevation; and Fig. 21 is a section taken substantially on line 21—21 of Fig. 19.

The valved pipe structure or installation which I have chosen to illustrate my invention includes a plurality of pipe sections 30 joined together at their adjacent ends by pipe flanges 31. The number of pipe sections will, of course, depend upon the length of the pipe installation; and, although I have shown a straight pipe arrangement, it will be understood that it may have various bends and turns therein to suit the particular conditions of installation. The pipe assembly includes therein one or more valves 32 for controlling the flow of the pipe contents therethrough. It will be understood that the pipe flanges 31 and the valves 32 may take the forms shown or any other well-known forms, to all of which my invention is equally well adapted.

In some instances, the pipe structure may be used for the carrying of a hot fluid or gas or vapor, such, for example, as hot water, hot air, or steam for various heating and other purposes. It is desirable in most instances to insulate such structures against the loss of heat from the heated medium passing therethrough, and my invention is well adapted for that purpose. Such structures will be referred to herein as "hot" pipe structures or insulations.

In other instances the pipe structure may be employed for conveying a cold fluid or the like, such, for example, as a refrigerating brine or cold air for air conditioning purposes; and pipe installations of this character will be referred to herein as "cold" pipe structure. It is highly desirable in many instances to insulate cold pipe structures against the transfer of heat, and my invention is also well suited for that purpose.

The insulation structure as a whole takes the form of a plurality of units, successively mounted one after the other upon and throughout the length of the valved pipe structure. Although these several units cooperate with each other to provide thermal insulation throughout the entire length of the pipe installation, inclusive of pipe flanges 31 and valve 32, the insulation structure per se for the different parts of the installation will be described separately to facilitate description and understanding of my invention.

*Pipe insulation for "hot" pipe structure*

This structure, which is illustrated in Figs. 1 to 8, inclusive, preferably takes the form of a plurality of semi-circular, self-contained units 40 that are secured in circumferentially-disposed pairs or groups upon the pipe section (Fig. 1). It will be understood, however, that, if desired, the units may be less than a semi-circle in cross-section so that a group of three or more may be employed to completely enclose the pipe without departing from my invention.

Each unit comprises a plurality of spaced metallic sheets 41, 42, and 43 formed of a material which possesses relatively low reflective characteristics when exposed to radiation of wave lengths within the visible portion of the electromagnetic spectrum and relatively high reflective characteristics when exposed to radiation of longer wave lengths than the visible portion of the electromagnetic spectrum, as more fully disclosed in my aforesaid patent. Such a material possesses relatively low reflective efficiency when exposed to visible radiation and relatively high reflective efficiency when exposed to infra-red radiation. I have found that commercial black steel well serves this purpose, the sheets of steel being of sufficient stiffness and thickness to retain preformed shape. The thickness of the metal may be varied so long as the foregoing characteristics are retained. The outer sheet 41 is, preferably, of greater thickness than the other sheets for obvious protection purposes.

In carrying out my invention in connection with "hot" pipe insulation the metallic sheets are spaced preferably in the manner taught in my aforesaid patent. The metallic sheets are so constructed and arranged that they provide a plurality of unobstructed and substantially parallel air spaces which are practically sealed apart from each other. The metallic sheet 43 which is nearest the hot pipe 30 is spaced comparatively close thereto and the remaining sheets 42 and 41 are spaced progressively farther apart as they approach the outside of the structure. The metallic sheets are, preferably, spaced in accordance with the radiation frequency derived from the existent temperature difference ranges. That is to say, the metallic sheets 41, 42, and 43 are so spaced with respect to the hot pipe section 30 that the wall of the pipe section 30 and the outer sheet 41 form an insulating space of certain width. The remaining sheets 42 and 43 are so spaced apart and grouped that the central plane of the same (as a group) lies closer to the hot pipe 30 than to the outer sheet 41. I have found that excellent results are obtained by so grouping the sheets that the central plane of the group of sheets 42 and 43 is spaced from the hot pipe 30 a distance which falls within the dimensional limits of less than one-half and more than one-third of the distance between the hot pipe 30 and the outer wall 41. In this way, the metallic sheets 41, 42 and 43 are spaced with respect to the "hot" pipe 30, and with respect to each other, in such a manner as to gain the near maximum insulation against the transfer of heat by radiation, convection and conduction. It is to be understood, however, that so far as certain of the structural features of my invention are concerned, the kind of material employed and the relative spacing of the sheets may be varied somewhat without departing from my invention.

Each metallic sheet of proper size is formed to a semi-circular shape with outwardly-projecting flanges 44 extending along and throughout its longitudinal edges. The sheets of each unit are fixedly secured together by lateral strips 45; the flanged edges of the sheets being provided with pockets 46 to receive such strips. The strips 45 are welded, or otherwise secured, in the pockets 46 which are of a depth equal to the thickness of the strips 45 so that the exposed strip surfaces are flush with the adjacent surfaces of the sheet flanges 44. The strips 45 are located at properly spaced points along the sheet edges and they are formed, preferably, of a high-chrome nickel alloy of low heat conductivity. This material has approximately only ⅓ of the heat-conduction capacity of the metallic sheets 41 to 43, whereby heat loss by conduction along the strips 45 is minimized. Fastening devices 47 pass through the strips 45 and outer sheet flanges 44 for securing the units 40 of each pair or group firmly together upon the pipe section.

The innermost metallic sheet 43 of each unit 40 is provided with a plurality of indents 48 of a depth substantially equal to the distance the sheet 43 is to be spaced from the hot pipe 30. When a pair of units 40 is placed in position upon the pipe section and the fastening devices 47 are secured, the indents 48 (which are preferably arranged at approximately 90 degrees apart for uniform spacing of the sheet 43) are brought into firm seated engagement with the pipe 30 so that the pair or group of units is tightly clamped upon, and will be held in definite position upon the pipe with the flanges 44 of adjacent units of each pair or group seated firmly upon each other.

In certain instances, good results may be obtained by employing a comparatively thin gasket (not shown), formed of any suitable non-conducting material, between the units of each pair or group. In this arrangement, there is provided around the pipe a plurality of semi-circular air spaces which are substantially sealed apart from each other. Such a gasket may extend from the outer edge of the outer sheet flange 44 to the pipe 30 or only to the inner sheet 43.

From the foregoing, it will be seen that when each pair or group of units is assembled upon the pipe, the metallic sheets form with respect to each other and with respect to the pipe 30 a plurality of disconnected, substantially parallel air spaces 50, 51, and 52, which progressively increase in width from the pipe 30 to the outer sheet 41. The relative widths of these spaces are, preferably, those provided by spacing the sheets in the manner hereinabove described, whereby highly efficient results are obtained in preventing transfer of heat from the contents of pipe 30 past the insulation structure. The number of sheets employed in each unit may be varied, and in that case the several sheets should, preferably, be spaced in the manner already described.

The units 40 are of comparatively short length so that they may be readily and easily manufactured, shipped, stocked and handled. Several pairs or groups of units 40 may be required to cover a single pipe section 30, as shown in Fig. 1, and for best results I blank-off each pair of units from the next adjacent pair.

The ends of the units 40 are so constructed that the ends of the insulation spaces 50, 51, and 52 are open. To minimize the formation of convection currents when the several units are assembled in endwise relation upon the pipe structure, as well as to increase the insulation efficiency of the structure as a whole, I employ means for blanking off these spaces at the adjacent ends of the units. To this end, I preferably employ a comparatively thin metallic disk or washer-like member 53 (Figs. 1, 2, 4, and 8) which may be formed of a high chrome nickel alloy material having the same thermal characteristics as the material employed for the strips 45. The body of this washer or disk 53 is of sufficient width to extend from the pipe 30 throughout the width of and slightly beyond the insulation unit 40. It is split at 54 so that it may be flexed and spread apart (as illustrated in dotted lines in Fig. 8) for ready application to the pipe 30. In use, a pair of units 40 are first secured in place upon the pipe section, after which the disk 53 is placed upon the pipe against the ends of the sheets 41, 42, and 43. When another pair of units is applied, their ends are brought into position against the disk 53 so that a single disk seals the adjacent ends of the respective air spaces of adjacently-mounted unit pairs.

Pipe sections are usually made up in standard lengths. The insulation units 40 are, preferably, of such length that a predetermined number of the same, successively applied in lengthwise relation, will fit the standard pipe length. However, should the pipe length vary to suit certain particular installation conditions, the units are of such character that they may be trimmed down in length to fit the particular installation requirements.

Pipe insulation for "cold" pipe structure

Structure of the character illustrated in Figs. 9 and 10 may be employed for insulating "cold" pipe structure in accordance with my invention.

This structure is similar to that shown in Figs. 1 to 8, inclusive, except that the metallic sheets are mounted in reversed fashion to accommodate the reversed heat flow condition. The sheets of each unit are so spaced with respect to each other and to the pipe to be insulated that the outermost sheet is located comparatively close to the next sheet, and the other sheet or sheets and the pipe are spaced progressively farther apart toward the pipe. This arrangement provides a comparatively narrow insulating space adjacent the higher temperature area (the atmosphere) with the remaining spaces of progressively increasing depth toward the lower temperature area (the cold pipe).

Specifically, this insulation structure is comprised of a plurality of units 60 of semi-circular shape joined together and mounted upon the cold pipe 61 in pairs. Each unit 60 comprises metallic sheets 62, 63, and 64 which are formed of the same material as the sheets of the previously-described unit 40. The sheets 62 and 63 are spaced apart a comparatively short distance while the sheets 63 and 64 and the pipe 61 are spaced apart progressively increasing distances.

Other than above described, the structure shown in Figs. 9 and 10 is the same as that of Figs. 1 to 8, inclusive, except that the indents 65 formed on the inner sheets 64 of the units 60 are of greater depth to accommodate the increased spacing of the inner sheet 64 from the cold pipe 61, as occasioned by the reverse heat flow condition.

"Hot" pipe insulation modification

The metallic sheets of the insulating units 40 and 60 are preferably plain-surfaced; however, if desired, the sheets may be preformed to provide angular surfaces therein for increased strength, durability and insulation effects. One form of insulation structure of this modified character is illustrated in Fig. 11.

This structure includes a plurality of units 70, each of which is of semi-circular shape and comprises a plurality of metallic sheets 71, 72, and 73. Each metallic sheet 71, 72, and 73 is provided with a plurality of similar and uniformly-spaced corrugations 75 which extend circumferentially throughout the length of the sheets. By corrugating the sheets in this manner, they are provided with a plurality of surfaces angular with the normal whereby an increased insulation value is added to the structure as a whole as more particularly pointed out in my aforesaid patent. The corrugations further add strength and rigidity to each sheet and to the structure as a whole.

The several sheets 71, 72, and 73 are spaced apart with respect to each other and with respect to the hot pipe 76 in the manner disclosed in Fig. 4. The units 70 are mounted in pairs upon the pipe 76, and the normally open ends of the spaces of adjacent units are blanked off by washer or disk members 77 formed of a high chrome nickel alloy of low heat-conduction capacity.

*Pipe flange insulation for "hot" pipe structure*

The pipe flanges 31 of Fig. 1 may take any desired form, such, for example, as the flange shown in Fig. 12. In this case, the flange hubs 80 are threaded upon the ends of the pipes 30 and the adjacent flanges are secured together by bolts and nuts 81 and 82 to hold the ends of the pipes in endwise abutting and sealed relation.

According to my invention, these pipe flanges are insulated against the transfer of heat by radiation, convection and conduction and one form of structure for carrying out my invention is shown in Figs. 12 to 15, inclusive.

This flange insulation structure is of a character adapted to carry forward the insulation effects and features of the insulation structure covering the pipe sections 30. In the structure illustrated, I have provided a cooperative relationship between the pipe insulation units 40 and the flange insulation structure which accomplishes this purpose whereby a substantially uniform insulation efficiency is obtained throughout the entire structure insulated.

The flange insulation structure takes the form, preferably, of a pair of semi-circular units 83 (Fig. 14). Each unit consists of an outer semi-circular metallic shell 84 of U-shape in cross-section and a smaller and similarly-shaped inner metallic shell 85. The inner shell 85 is provided with outwardly-extending flanges 86 along its curved edges which are welded, or otherwise secured, to the curved edges of the outer shell 84 for securing these shells together in a predetermined, fixed and spaced relationship. If desired, the inner shell flanges 86 may take the form of separate strips of high chrome nickel alloy material (similar to that of the strips 45) welded, or otherwise secured, to the respective sections 84 and 85; or spaced bridge strips of like material may be secured to the sections 84 and 85 at spaced points around and between the sections for a similar purpose.

The outer shell 84 is of such width that its opposite side walls 87 are disposed on opposite sides of the pipe flanges 31, preferably, in abutting relationship with the high chrome nickel alloy blanking washers or disks 53 at the adjacent ends of the pipe insulation units 40.

The inner and outer shells 84 and 85 are of such relative size that the space between their U-base portions 88 and 89 is of greater depth than the space between their sides 87 and 90. In this deeper space, between the shell base portions 88 and 89, there is mounted a metallic sheet 92 in parallel relation with respect to the shell base portions 88 and 89. The sheet 92 extends throughout the width of the outer shell 84 and it is welded, or otherwise secured, along its side edges to the outer shell side walls 87. The sheet 92 is so spaced from the shell walls 88 and 89 that there is formed a sealed air space 93 of uniform depth around the inner shell 85 and a wider space 94 between the sheet 92 and the wall 89 of the outer shell.

The inner shell 85 is of sufficient size to fit over the flanges 31 and the flange-fastening devices 81, 82 in spaced relation thereto providing a shallow insulating space 95 between the inner shell 85 and pipe flanges 31 of less depth than the space 93.

It will be seen from the foregoing that each unit 83 is of all-metal construction. The material from which these units are formed is, preferably, the same as that from which the pipe insulation units 40 are formed. That is to say, this material (preferably, commercial black steel) is of sufficient stiffness and thickness to retain preformed shape and it is of a dull non-bright character which possesses relatively low reflective characteristics when exposed to radiation falling within the wave lengths of the visible portion of the electromagnetic spectrum and relatively high reflective characteristics when exposed to radiation of wave lengths longer than the visible portion of the electromagnetic spectrum. Also, the metallic walls of the units 83 are spaced (with respect to each other and to the flanges 31) similarly to the metallic sheets 41, 42 and 43 of the pipe insulation units 40 so as to provide a relatively shallow space 95 next to the hot flanges 31 with the other spaces 93 and 94 progressively increasing in width toward the outer shell wall 89.

Two identical units 83 are employed for insulating each set of flanges 31. The opposite ends of the outer shell wall 89 of each unit are provided with outwardly extending flanges 96 with openings 97 therein adapted to receive suitable fastening devices 98 for securely clamping the units 83 upon the flanges 31. To minimize the loss of heat by conduction through the flanges 31 and metallic units 83, gaskets 99 formed of any suitable non-heat-conducting material may be mounted between the inner shell flanges 86 and the flange hubs 80 and between the units 83. One such gasket 99 is employed for each unit 83 and it, preferably, takes the form shown in Figs. 13 and 15. Specifically, this gasket has a flat portion 100 of substantially the shape of the ends of the units 83 which is large enough to cover the ends of the unit spaces 93, 94 and 95, the shell flange 96 and to extend inwardly to the pipe flanges 31 (Figs. 12 and 13). This gasket further includes a semi-circular portion having spaced legs 101 adapted to fit between the inner shell flanges 86 and the flange hubs 80. When the units are assembled upon the flanges 31, the gaskets 99 seal the ends of the air spaces provided by one unit from the ends of the air spaces of the other unit so that a plurality of semi-circular, substantially-sealed air spaces 93, 94 and 95 are provided in which the tendency toward the formation of convection currents is minimized. When the fastening devices 98 are secured in place, the units 83 are drawn tightly together and tightly down against the gasket legs 101 so that the structure as a whole is firmly clamped upon the flanges 31. If desired, the gaskets 99 may be dispensed with, in which case the metallic units would seat directly against the flange hubs 80.

It will be understood that in insulating pipe flanges for "cold" pipe structure, the shells 84 and 85 and the sheet 92 will be so relatively sized and arranged that the outermost space, corresponding to the space 94, will be comparatively shallow with the other spaces, corresponding to the spaces 93 and 95, progressively increasing in depth towards the flanges 31. An arrangement of this character is shown in Fig. 19 which will be described more fully hereinafter.

*Valve insulation for "hot" pipe structure*

The valve insulation structure is arranged to provide the desired insulation effect cooperatively with the insulation structure for the adjacent parts of the valved pipe structure. This structure, like that for the pipe sections and the pipe flanges, takes the form of self-contained units which may be readily and easily applied to and removed from the valve without disturbing the valved pipe assembly in any manner whatsoever.

More particularly, with respect to Figs. 16, 17, and 18, the valve 32 is of the so-called gate type having a body 110 with flanges 111 at the opposite ends thereon for securement to the adjacent flanges 31 carried by the adjacent pipe sections 30. The valve flanges 111 are secured to the pipe flanges 31 by suitable fastening devices 112, the valve and pipe flange structure being similar to the flange structure by which adjacent pipe sections 30 (Figs. 12-14) are secured together. The body portion 110 of the valve is extended upwardly and it supports a valve stem 113 adapted to be rotated by the hand wheel 114 to open and close suitable valve mechanism (not shown) contained within the valve body 110.

The structure for insulating the valve 32 preferably takes the form of a pair of self-contained metallic units 115 of identical construction and only one of them will be described in detail.

The valve unit 115 takes the general outline shape of one-half of the valve body, being adapted to fit sidewise thereupon. It includes a plurality of spaced, parallel metallic sheets 116, 117 and 118 which are, preferably, formed of the same material possessing the same characteristics and properties as the sheets employed for the pipe and flange units 40 and 83, respectively, hereinbefore described. Each of the metallic sheets 116, 117, and 118 is of semi-circular outline shape and they conform substantially to the outline shape of the valve structure. They are arranged in group fashion, leaving only the hand wheel 114 free for ready operation.

The innermost metallic sheet 116 is of sufficient size to fit freely over the valve body in spaced relation thereto. The other sheets 117 and 118 are supported progressively increasing distances apart toward the outer part of the structure. The spacing of these sheets is similar to spacing of the pipe insulation sheets 41, 42, and 43. That is to say, the space 119 between the sheet 116 and the valve body (higher temperature area) is comparatively shallow, except where the irregular shape of the valve structure prohibits it, and the other spaces 120 and 121 formed by the sheets 117 and 118 are of progressively increasing depth toward the outside or lower temperature area. In this manner the spacing features and requirements of my aforesaid patent are included in the valve insulation structure like in the pipe (Figs. 1-8) and flange (Figs. 12-14) insulation structure already described.

The metallic sheets 116, 117, and 118 are supported in the foregoing spaced relationship as a unit, as follows: The upper end portions 116a, 117a, and 118a of the sheets are turned horizontally inwardly toward the valve stem 113 and these end portions are provided with aligned, semi-circular openings concentric with the valve stem 113. The edges of the metallic sheets defining these openings are secured by welding, or otherwise, to a comparatively thin, semi-circular metallic strip 122 formed of a high chrome nickel alloy material of low heat conductivity. The strip 122 is adapted to fit rather closely around a half portion of the circumference of the valve stem 113. The lower parts of the vertical portions of the metallic sheets are provided with aligned semi-circular openings concentric with the horizontal axis of the valve body 110. The edges of the metallic sheets defining these openings are secured by welding, or otherwise, to a semi-circular strip 123 similar, except for size, to the strip 122. The strip 123 is adapted to fit rather closely around a half portion of the circumference of the rounded ends of the valve body 110. The sheet edges between the strips 122 and 123 are secured by welding, or otherwise, to metallic strips 124 formed of the same material as the strips 122 and 123; and the bottom sheet edges between the strips 123 are likewise secured to a similar strip 125. The strips 122, 123, 124, and 125 may be formed as a single continuous piece having sections 122, 123, 124, and 125, or they may be formed and secured as separate pieces, as desired. These strips are of sufficient width to close and substantially seal the air spaces 120 and 121 of one unit 115 apart from each other and from the corresponding spaces of the other unit 115 when the two units are assembled upon the valve. The vertical strips 124 are provided with spaced, outwardly extending ears 126 which receive fastening devices 127 for securement of the units 115 together. If desired, good results may be obtained by omitting the strip sections 124 and 125 and, instead, providing the sheet edges with flanges and supporting strips similar to the flanges 44 and strips 45 of Figs. 1 to 8. In that case, also, the units would be secured together similarly to the units of Figs. 1 to 8.

In applying the pair of units to the valve structure, gaskets 128 and 132 formed of any suitable non-heat-conducting material may be mounted between the adjacent sheet-supporting and space-blanking strips 124 and 125, respectively. Gaskets 129 and 130 formed of a similar material may be mounted between the strips 123 and the valve body 110 and between the strip 122 and the valve stem 113. The gaskets 128, 129, 130 and 132 may be formed as one continuous piece (with sections 128, 129, 130, and 132) or as separate pieces, as above described. Or, if desired, these gaskets may be omitted with good results. The gaskets serve to more securely seal the joints between the units 115 and between the units and the valve structure, as well as to reduce to the minimum metal-to-metal contact between the insulation units themselves and between such units and the valve structure to further minimize heat loss by conduction. When the insulation units are tightly drawn together by the fastening devices 127, the semi-circular strips 122 and 123 are tightly clamped around and upon the valve stem 113 and circular valve body ends, respectively, to hold the insulation structure as a whole in a fixed position upon the valve.

The flange structure 111, 31 between the valve 32 and the pipe sections 30 is, preferably, insulated by structure 131 like that shown in Figs. 12, 13, and 14 and it, therefore, need not be described in further detail. The length of the valve insulation units is such that when the flange insulation 131 and the valve insulation are assembled (Fig. 16) the outer valve insulation sheet 118 abuts the adjacent outer side wall 87 of the flange insulation 131 whereby complete insulation coverage is provided throughout the valve structure.

Valve insulation for "cold" pipe structure

Valve insulation, according to my invention, for "cold" pipe installations may take practically the same form as the insulation for "hot" pipe installations previously described, except for reversed sheet spacing to accommodate the reversed heat flow condition. Insulation of this character is illustrated in Figs. 19 to 21, inclusive.

This structure includes a pair of identical all-metal units 140, only one of which will be described in detail. Each unit comprises metallic sheets 141, 142, and 143 formed, preferably, of the same kind of material (and having the same insulating characteristics and properties) as the material employed for the sheets of the previously described pipe, flange and valve insulating units. The units 140 are so shaped that, when they are assembled upon the valve 144, they provide a shell-like structure covering practically all of the valve 144 except the hand wheel 145 thereof. To approximate generally, the outline shape of valve 144, the metallic sheets 141, 142 and 143 are so shaped that the lower part of the assembled shell-like structure, which covers the valve body 146, is of rectangular shape in horizontal section (Fig. 21) and its upper part above the valve body 146 is of inverted V-shape in cross section (Fig. 20).

The metallic sheets of each unit 140 are supported in parallel spaced relation by metallic strips (or sections of a continuous strip) 147, 148, 149, and 150 of high chrome nickel alloy material which are similar to the metallic strips or sections 122, 124, 123, and 125, respectively, of the form of valve insulation of Fig. 16. Additional support is afforded by metallic spacers 170 (Fig. 21) secured by welding or otherwise, to the corner portions of adjacent sheets 141, 142, and 143. These spacers 140 are, preferably, located at spaced intervals throughout the height of the sheets, and they are formed of a high chrome nickel alloy material similar to that used for the strips 147–150. The strips or sections 147–150 seal the spaces 151 and 152 between the sheets 141, 142, and 143 apart from each other and from the corresponding spaces of the other unit when the two units are assembled.

Each unit fits over a side portion of the valve 144 in spaced relation thereto so as to form between the inner sheet 141 and the valve 144 an additional insulation space 153. In this form of structure, the higher temperature area surrounds the outer sheet 143 and the lower temperature area is within the valve 144; wherefore, in carrying out the insulation features of my invention, the sheets 141, 142, and 143 are so spaced apart that the outermost space 151 adjacent the higher temperature area is comparatively shallow and the other spaces 152 and 153 progressively increase in depth toward the valve or lower temperature area.

The sheet 141, 142, and 143 may be plain surfaced or they may be preformed to provide, in each thereof, a plurality of angular and intersecting plane surfaces of the character disclosed in my aforesaid patent. For example, the surfaces of the sheets forming the top, bottom and side walls of the shell-like units may be preformed to provide therein angular intersecting plane surfaces 168. Ribs 169 may be provided at the points of intersection of the plane surfaces, successive ribs 169 being formed in opposite directions for reasons which will be well understood from my aforesaid patent. Or, if desired, all of the surfaces of the sheets 141, 142 and 143 may be thusly preformed for increased strength and insulation advantages.

Further construction of this form of valve insulating structure is substantially the same as that of Fig. 16. The operation of these valve insulation structures is similar except for the reversed functioning of the structures due to reversed sheet spacing.

Flange insulation structure embodying my invention and adapted for "cold" pipe structure is illustrated in Fig. 19. This structure is similar to that shown in Figs. 12, 13, 14, and 16 except for reversed spacing of metallic insulating surfaces to accommodate reversed heat flow conditions.

Specifically, the outer shell 161, inner shell 162 and sheet 163 are so sized, spaced and related with respect to each other and to the pipe-and-valve flange 164 that the outermost space 165 (next to the higher temperature area) is comparatively shallow and the other spaces 166 and 167 progressively increase in depth toward the flange structure 164 (lower temperature area). In all other respects, including kind of material, and spacing relationship of the parts, this "cold" flange insulation structure is similar to the "hot" flange insulation structure of Figs 12–14, 16.

Operation

It is believed that the operation and advantages of my invention will be obvious from the foregoing. It will be seen that my invention provides for thermal insulation of valved pipe structure with near maximum efficiency. This is accomplished by the use of a plurality of metallic sheets or walls formed of a material (such as commercial black steel) which has a low degree of reflectivity when exposed to visible light and which increases in reflective ability when exposed to radiant heat. These walls or surfaces, although heat conducting per se, are utilized to practically reduce to the minimum the transfer of heat by radiation, convection and conduction by spacing such sheets from each other and from the structure insulated, in a manner predetermined by the radiation frequency.

The insulation structure, throughout the length of the pipe installation, inclusive of that for the pipe sections, flanged joints and valves takes the form of a plurality of all-metal units which may be easily and quickly applied and removed. These units are of simple construction and are light in weight and may be manufactured very cheaply. Furthermore, the several units are very durable and may be used over and over again with substantially uniform insulation efficiency. The inherent deficiencies of prior pipe insulations, including break down due to vibration, loss of insulation properties due to psychrometric conditions, bacteria, etc., are avoided.

It is to be understood that my invention is not limited to the specific embodiments shown in the drawings, but that various changes may be made in the parts and the arrangements thereof without departing from my invention as defined by the claims which follow.

I claim:

1. In structure of the class described, a plurality of self-contained units adapted to be mounted upon the structure insulated in enclosing relation with respect to the latter, said units being mounted in annularly arranged groups with the several groups mounted closely adjacent each other in succession throughout the length of the structure insulated, each said unit comprising a plurality of steel sheets, means for holding said sheets in spaced relation with respect to each other, and means for securing each group of units together and upon the structure insulated independently of other adjacent groups of units.

2. In structure of the class described, a plurality of self-contained units adapted to be mounted upon the structure insulated in enclosing relation with respect to the latter, said units being mounted in annularly arranged groups with the several groups mounted closely adjacent each other in succession throughout the length of the structure insulated, each said unit comprising a plurality of commercial black steel sheets, means for holding said sheets in spaced relation with respect to each other, and means for securing each group of units together and upon the structure insulated independently of other adjacent groups of units.

3. In structure of the class described, a plurality of self-contained units adapted to be mounted upon the structure insulated, said units being arranged in annularly-disposed group which are mounted closely adjacent each other in succession throughout the length of the structure insulated, each said unit comprising a plurality of sheets formed of metal of sufficient stiffness and thickness to withstand preformed shape and possessing relatively low reflective efficiency when exposed to visible radiation and relatively high reflective efficiency when exposed to infra-red radiation of wave lengths longer than the visible portion of the electromagnetic spectrum, means for holding said sheets in spaced relation with respect to each other, and means secured to the outermost of said sheets of each unit for the reception of fastening devices for securing each group of units together upon the structure insulated.

4. In structure of the class described, a group of self-contained metallic units adapted to completely enclose the structure to be insulated, each said unit comprising a plurality of metallic sheets of sufficient stiffness and thickness to withstand preformed shape and formed of a dull non-bright material possessing relatively low reflective characteristics when exposed to visible light and relatively high reflective characteristics when exposed to radiant heat, means for holding said sheets in a predetermined spaced relationship with respect to each other, and means associated with said sheet holding means for securing said units together and upon the structure insulated.

5. In structure of the class described, a plurality of self-contained units adapted to be mounted upon the structure insulated, said units being arranged in groups which surround the structure insulated, which groups are mounted closely adjacent each other in succession throughout the length of the structure insulated, each said unit comprising a plurality of sheets, means for holding said sheets in such spaced relation with respect to each other that a comparatively shallow air space is provided adjacent the higher temperature area and the other air spaces progressively increase in depth toward the lower temperature area, and means for securing each group of units together upon the structure insulated independently of any of the other groups of units.

6. In structure of the class described, a plurality of units arranged in groups to completely surround the structure insulated, said groups being mounted closely adjacent each other throughout the length of the structure insulated, each said unit comprising a plurality of metallic sheets, metallic strips having relatively low thermal conductivity secured to the side edges of said sheets for holding the latter in predetermined spaced relationship with respect to each other, and means associated with said strips for securing said units together upon the structure insulated.

7. In structure of the class described, a plurality of units arranged in groups to completely surround the structure insulated, said groups being mounted closely adjacent each other throughout the length of the structure insulated, each said unit comprising a plurality of metallic sheets, spaced metallic strips having relatively low thermal conductivity secured to the side edges of said sheets for holding the latter in predetermined spaced relationship with respect to each other, means associated with said strips for securing said units together upon the structure insulated, and gasket means associated with said strips preventing metallic contact between said units when the latter are secured together in groups.

8. In structure of the class described, a plurality of self-contained units adapted to be mounted upon the structure insulated, said units being arranged in groups to completely surround the structure insulated, which groups are mounted closely adjacent each other in succession throughout the length of the structure insulated, each said unit comprising a plurality of metallic sheets, means for holding said sheets in spaced relation to each other, means for securing the units of each group together upon the structure insulated, and gasket means formed of a non-heat-conducting material disposed between the units of each group.

9. In thermal insulation for pipes, a plurality of semi-circular metallic units arranged in pairs around the pipe, each said unit comprising a plurality of metallic sheets of semi-circular form, metallic members of low heat conductivity secured to the side edges of said sheets holding the latter in spaced relation with respect to each other and sealing the side edges of the air spaces between said sheets apart from each other, means associated with said members for securing each pair of units upon the pipe, and means associated with the innermost of said metallic sheets for spacing said units a predetermined distance from the pipe.

10. In thermal insulation for pipes, a plurality of parti-circular metallic units arranged in groups around the pipe, each said unit comprising a plurality of metallic sheets of semi-circular form, metallic members of low heat conductivity secured to the side edges of said sheets holding the latter in spaced relation with respect to each other, means associated with said members for securing each group of units upon the pipe, and means associated with the innermost of said metallic sheets for spacing said units a predetermined distance from the pipe.

11. In thermal insulation for pipes, a plurality of parti-circular metallic units arranged around the pipe, each said unit comprising a plurality of metallic sheets of similar parti-circular form having low reflective characteristics when exposed to visible light and high reflective characteristics when exposed to radiant heat, metallic members of relatively low heat conductivity secured to the side edges of said sheets holding the latter in spaced relation with respect to each other, said sheets being so spaced with respect to each other and to the pipe that the space next adjacent the higher temperature area is comparatively shallow and the other spaces are of progressively increasing depth toward the lower temperature area, means associated with said members for securing said units upon the pipe, and means associated with the innermost of said metallic sheets for spacing said units a predetermined distance from the pipe.

12. Pipe insulation structure which includes a self-contained unit comprising a plurality of imperforate metallic sheets of sufficient stiffness and thickness to withstand preformed shape, strips secured along the side edges of said sheets for holding the latter in predetermined spaced relation without obstruction in the space therebetween, and a plurality of indents of predetermined depth in the metallic sheet next adjacent the pipe adapted to engage the latter only and space the units a predetermined distance from the pipe.

13. Pipe insulation structure which includes a self-contained unit comprising a plurality of imperforate metallic sheets of sufficient stiffness and thickness to withstand preformed shape, and formed of a material which possesses relatively low reflective ability when exposed to visible light and relatively light reflective ability when exposed to radiant heat, strips of relatively low heat conductivity secured along the side edges of said sheets for holding the latter in predetermined spaced relation, a plurality of indents of predetermined depth in the metallic sheet next adjacent the pipe adapted to engage the latter and space the unit a predetermined distance from the pipe, and means associated with said strips for securement of the unit upon the pipe.

14. Pipe insulation structure which comprises a plurality of units of arc segments in form mounted around the periphery of pipe, each of said units comprising a plurality of metallic sheets, means for supporting said sheets in spaced relation with respect to each other, the innermost of said sheets being provided with means for spacing said units from the pipe, and means which, together with said sheet supporting means, is adapted to blank-off the spaces between said sheets and between said units and the pipe into a plurality of disconnected air spaces.

15. Pipe insulation structure which comprises a plurality of parti-circular units mounted around the pipe, each said unit comprising a plurality of metallic sheets, means for holding said sheets in spaced relation with respect to each other and with respect to the pipe, means for securing a group of said units together around the pipe enclosing the latter, and means carried by the pipe and blanking the ends of all the spaces between the sheets of the unit of one group from the corresponding spaces of the next successive group of units.

16. Pipe insulation structure which comprises a plurality of parti-circular units mounted in groups upon the pipe, each said unit comprising a plurality of metallic sheets, means for holding said sheets in spaced relation with respect to each other and with respect to the pipe, means for securing each group of said units together, and a comparatively thin metallic disk formed of a material of low heat conductivity mounted upon the pipe between the adjacent ends of successive groups of units and blanking the ends of the spaces of one group of units from the corresponding spaces of the next successive group of units.

17. Pipe insulation structure which comprises a plurality of parti-circular units mounted in groups around the pipe, each said unit comprising a plurality of metallic sheets, strips formed of a metal of relatively low thermal conductivity secured to the side edges of said sheets supporting the latter in spaced relation with respect to each other, means spacing said units from the pipe, means for securing each said group of units together, and means carried by the pipe and adapted to blank-off the ends of the spaces of one group of units from the ends of the spaces of next adjacent group of units.

18. Pipe insulation structure which comprises a plurality of parti-circular units mounted in pairs upon the pipe, each said unit comprising a plurality of metallic sheets, strips formed of a metal of relatively low thermal conductivity secured to the side edges of said sheets supporting the latter in spaced relation with respect to each other, means spacing said units from the pipe, means for securing each said pair of units together, and a relatively thin metallic disk formed of a material of low thermal conductivity detachably mounted upon the pipe between and abutting the adjacent ends of successively mounted pairs of units for blanking-off the ends of the spaces provided by the pair of units.

19. In structure for thermally insulating pipes, a group of all-metal units adapted to fit upon and completely enclose the pipe, each said unit comprising a plurality of similarly-shaped metallic sheets semi-circular in cross-section and each corrugated circumferentially throughout their length providing a plurality of angularly disposed surfaces therein, means secured to the side edges of said sheets for holding the latter in spaced relation, and means cooperating with said latter means for securing said units together and upon the pipe.

20. Pipe flange insulating structure which comprises self-contained all-metal units of semi-circular shape, each said unit comprising an outer parti-circular shell, a smaller and similarly shaped inner shell, means for securing said two shells together in spaced relation, said inner shell being adapted to fit over the pipe flange in spaced relation thereto, a parti-circular sheet mounted in the space between said shells in spaced relation thereto, and means for securing said units together for securement of the latter upon the pipe flange.

21. Pipe flange insulating structure which comprises all-metal units of parti-circular shape, each said unit comprising an outer parti-circular shell, a smaller and similarly shaped inner shell, means for securing said two shells together in spaced relation, said inner shell being adapted to fit over the pipe flange in spaced relation thereto, a parti-circular sheet mounted in the space between said shells in spaced relation thereto, said shells and sheet being formed of a material of sufficient stiffness and thickness to retain preformed shape and possessing relatively low reflective characteristics when exposed to radiation of wave lengths falling within the visible portion of the electromagnetic spectrum and relatively high reflective characteristics when exposed to wave lengths longer than the visible portion of the electromagnetic spectrum, and means securing said units together upon the pipe flange.

22. Pipe flange insulating structure which comprises a pair of self-contained all-metal units of semi-circular shape, each said unit comprising an outer semi-circular shell, a smaller and similarly shaped inner shell, means for securing said two shells together in spaced relation, said inner shell being adapted to fit over the pipe flange in spaced relation thereto, a semi-circular sheet mounted in the space between said shells in spaced relation thereto, the walls of said shells, said sheet and the pipe flange being so relatively spaced with respect to each other that the space adjacent the higher temperature area is of shallow depth and the other spaces are of progressively increased depth toward the lower temperature area, and means for securing said units together and upon the pipe flange without disturbing said spaced relation.

23. Structure for thermally insulating pipe flanges which includes a parti-circular outer metallic shell of U-shape in cross-section and having side walls and U-base walls, a smaller and similarly shaped metallic inner shell, the shell side walls being spaced apart a less distance than their base walls, means for securing said shells together in spaced and substantially parallel relation, a metallic sheet mounted in the deeper space between the shell base walls and substantially parallel with and spaced from the base wall of the inner shell a distance substantially equal to the distance between the shell side walls, and means associated with the outer shell for securing said shells as a unit upon the structure insulated.

24. Structure for thermally insulating pipe flanges which includes a parti-circular outer metallic shell of U-shape in cross-section, a smaller and similarly shaped metallic inner shell, the shell side walls being spaced apart a less distance than their base walls, means for securing said shells together in spaced and substantially parallel relation, a metallic sheet mounted in the deeper space between the shell base walls and substantially parallel with and spaced from the base wall of the inner shell a distance substantially equal to the distance between the shell side walls, and means for blanking-off the ends of the shell spaces when the insulating structure is mounted upon the pipe flange.

25. Structure for thermally insulating pipe flanges which comprises a pair of parti-circular, metallic units each of which includes a parti-circular outer shell of U-shape in cross-section, a smaller and similarly shaped inner shell, the shell side walls being spaced apart a less distance than their base walls, means for securing said shells together in spaced relation, a metallic sheet mounted in the deeper space between the shell base walls and spaced from the base wall of the inner shell a distance substantially equal to the distance between the shell side walls, and gasket structure mounted over the ends of said units and between said units and the pipe flange for blanking-off the ends of the shell spaces when the insulating structure is mounted upon the pipe flange and minimizing heat flow by conduction through the unit and pipe flange structure.

26. In structure for insulating pipe flanges, a pair of parti-circular and all-metal units each said unit including an outer shell of U-shape in cross-section, a smaller and similarly shaped inner shell, means on said inner shell for securing said two shells together to provide a U-shaped space, a metallic sheet mounted in the base portion of said space in spaced relation to the shell base walls, outwardly extending flanges at the opposite ends of said outer shell adapted to receive means for fastening said pair of units together, and gasket means disposed between and throughout the opposite ends of said units and between said units and the pipe flange.

27. In structure for thermally insulating a valve having a body and valve operating stem projecting therefrom, all metal units which, when assembled upon the valve, provide a shell-like structure enclosing the valve body, each of said units including a plurality of spaced metallic sheets, said sheets having the general shape of a side portion of the valve body with their side edges turned toward the valve body and their top and bottom edges turned inwardly towards the valve stem and the bottom of the valve body, respectively, said sheet side and top edges being shaped to partially surround the valve body and stem, respectively, means for holding said sheets in spaced relation, and means for securing said units together to clamp them in position upon the valve structure with the valve body completely enclosed.

28. In structure for thermally insulating a valve having a body and valve operating stem projecting therefrom, a pair of similar all-metal units which, when assembled upon the valve, provide a shell-like structure enclosing the valve body, each of said units including a plurality of spaced metallic sheets, said sheets having the general shape of a side portion of the valve body with their side edges turned toward the valve body and their top and bottom edges turned inwardly towards the valve stem and the bottom of the valve body, respectively, said sheet side and top edges being shaped to partially surround the valve body and stem, respectively, metallic strips secured to and extending over the top, side and bottom edges of said sheet securing the latter together and sealing the spaces between the sheets apart from each other, gasket means mounted along said strips, and fastening devices supported by said strips for securing said pair of units together and to the valve structure.

29. In structure for thermally insulating a valve having a body and a valve operating stem, all-metal units each fitting over one side portion, a part of the top portion and a part of the bottom portion of the valve body, each said unit including a plurality of spaced metallic sheets, each of the shape of the unit and having parti-circular openings in their top and side edges receiving the valve stem and valve body, said sheets each being formed of a material of sufficient thickness and stiffness to retain preformed shape and possessing relatively low reflective characteristics when exposed to visible light and relatively higher reflective characteristics when exposed to radiant heat, means for holding said sheets in a predetermined spaced relation, and means for detachably securing said units together and upon the valve structure to completely enclose the body of the latter.

30. In structure for thermally insulating a valve having a circular body and a projecting valve-operating stem, all-metal units each of such shape that when they are assembled upon the valve they completely enclose the latter, each said unit including a plurality of spaced metallic sheets with the inner sheet adapted to fit over the valve body in spaced relation thereto, and each said sheet having a parti-circular opening adapted to receive the valve stem and a parti-circular opening adapted to receive the valve body, means for holding said sheets in a predetermined spaced relation, means for securing said units together to form a complete covering for the valve body, and gasket means interposed between the adjacent surfaces of said units themselves and also between the sheet surfaces defining said parti-circular openings and the valve stem and body, respectively.

JOSEPH M. LE GRAND.